G. W. NORTHROP.
AUTOMATIC BRAKE TO BE APPLIED TO WHEELED VEHICLES.
APPLICATION FILED FEB. 24, 1908.
967,824.
Patented Aug. 16, 1910.
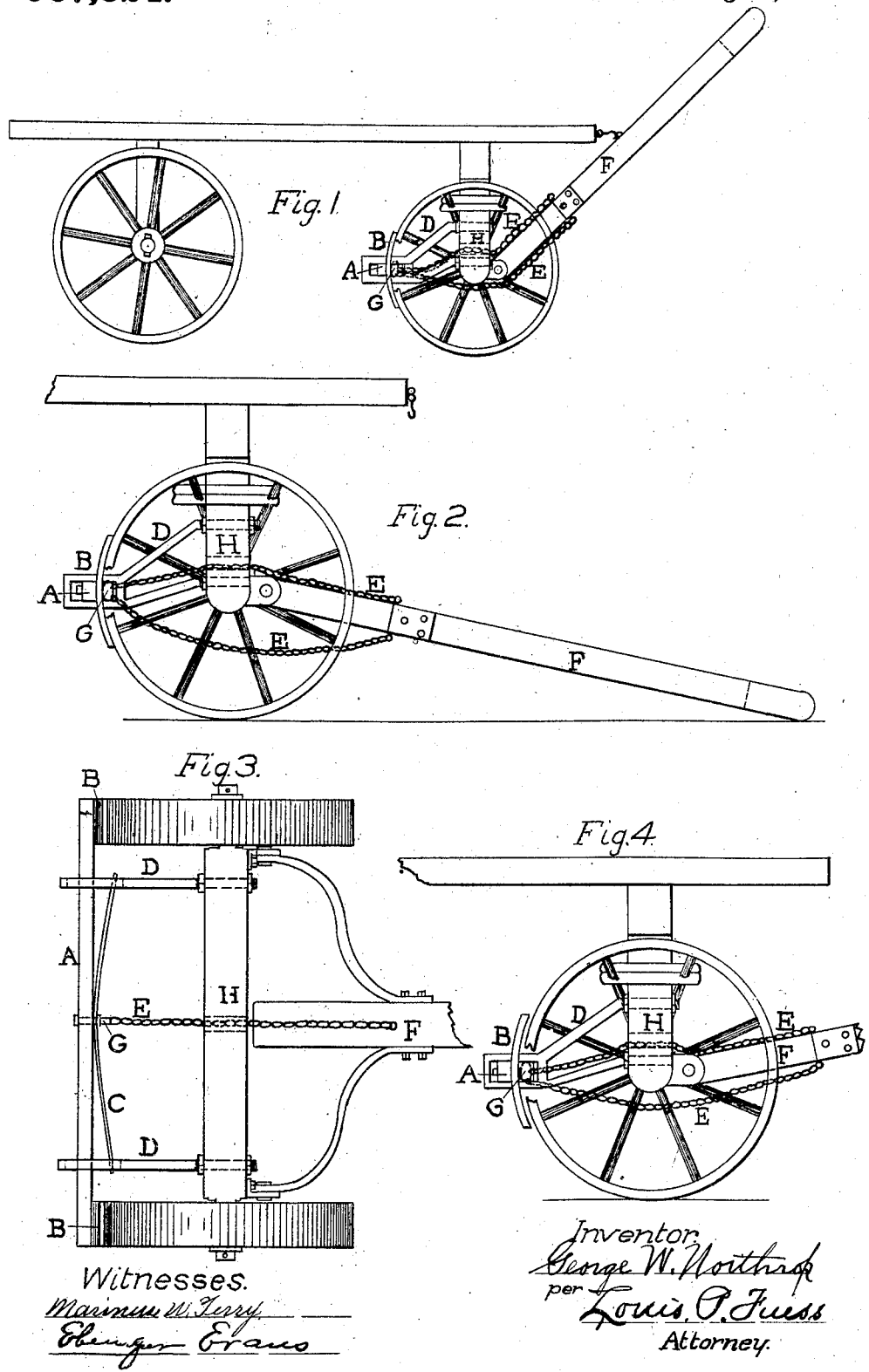

UNITED STATES PATENT OFFICE.

GEORGE W. NORTHROP, OF WATERVILLE, NEW YORK, ASSIGNOR OF ONE-HALF TO JOSEPH J. O'CONNOR, OF WATERVILLE, NEW YORK.

AUTOMATIC BRAKE TO BE APPLIED TO WHEELED VEHICLES.

967,824.  Specification of Letters Patent.  Patented Aug. 16, 1910.

Application filed February 24, 1908. Serial No. 417,230.

*To all whom it may concern:*

Be it known that I, GEORGE W. NORTHROP, a citizen of the United States, residing in the village of Waterville, in the county of Oneida and State of New York, have invented a new and useful Automatic Brake to be Applied to Wheeled Vehicles, of which invention the following is a specification.

My invention is an automatic brake which, is to be mounted and connected to act on the front wheels of a truck or wagon, in such a way, that when the handle of the truck, or the pole of the wagon is raised above or lowered below a horizontal position, a short chain which runs from the brake to the handle of the truck or pole of the wagon, will automatically set the brake and prevent the truck or wagon from being moved either by wind or otherwise, but, wherein, as soon as the handle or pole is raised or lowered to a horizontal position or to substantially a horizontal position, the brake is released by a release spring and the wheels can revolve and the truck can be moved: I attain this result by means of the mechanism illustrated in the accompanying drawing thereof in which—

Figure 1— shows the brake attached to the truck, the center of the nearer wheel being removed, as this adds greatly to the clearness of the drawing by breaking off the spokes: In this figure the handle is up, and the brake set: Fig. 2— is a detailed elevation, with the handle down and the brake set: Fig. 3— is a detailed plan with the handle either up or down, and the brake set: Fig. 4— is a detailed elevation with handle in position for drawing and the brake released.

Similar letters refer to similar parts throughout the several views.

"A" is the brake beam of suitable material and of a sufficient length to permit the brake shoes "B" to fit properly to the wheels when the brake is set.

"B" are the brake shoes, which are attached to the brake beam "A," one at each end thereof and are designed to be applied to the front wheels of a truck or wagon and to set the wheels and to operate to brake them when the handle to the truck or wagon is raised or lowered above or below substantially a horizontal position.

"C" is a release spring, and is preferably of steel, and is of a length sufficient to fit in properly to the brake hangers "D" as shown by Fig. 3— and is to be firmly affixed to the brake beam "A" at a point half way between the wheels of the truck or wagon, and so bent toward the front of the truck or wagon, that when the pressure is applied by the chains "E," as hereafter described, it will yield to such pressure and permit the brake shoes "B" to be set to the wheels whenever the handle "F" is raised or lowered beyond a substantially horizontal position, but which will spring back and thus release the brake shoes "B" when the handle "F" is in substantially a horizontal position, or a position to draw the truck or wagon.

"D" are the brake hangers of which there are two, one on each side and just inside the wheels of the truck or wagon, and which are preferably to be made of iron and so constructed, that they can be firmly attached to the axle of the truck or wagon "H" and which extend back from the front axle just far enough to permit the brake beam "A" to pass through a slot in the brake hangers "D" and to permit the play of the release spring "C" and of the brake beam "A", as the brake shoes "B" are set or released by the chains "E" in operating the brake.

"E" are the chains which connect the brake beam "A" with the handle of the truck or wagon "F" and are designed to operate the brake as follows: A substantial link or oblong ring "G" is firmly affixed to the center of the brake beam "A" by the same means by which the release spring "C" is affixed thereto, and so as to make it solid and substantial, to which two short chains "E" are attached, one of which is attached to the lower end of said oblong link or ring "G" and then passes forward and underneath the axle of the wagon or truck "H" to the handle or pole of the truck or wagon "F," where it is firmly affixed to the lower side of the handle or pole "F." The other short chain "E" is firmly attached to the upper end of said oblong link or ring "G" and then passes forward, above the former chain, as through a slot in the axle "H" made for that purpose and to the handle or pole of the truck or wagon, where it is firmly affixed to the upper side of the handle or pole "F," so that when the handle is lowered below a substantially horizontal position a strain is applied to the upper chain which is connected with brake beam "A" and thus sets the brake shoes "B", and when the handle or pole is raised above a substantially horizontal position a strain is applied to the lower chain "E," which is also connected with the brake beam "A" and sets the brake shoes "B", and when the handle is returned to substantially a horizontal position the release spring "C" releases the brake shoes "B" and allows the wheels to revolve.

The chains, or the like, may evidently be adjustably attached to the pole so that the position of the latter for the releasing of the brake may be at a convenient height between the extremes.

"F" is the handle to the truck, or pole to the wagon and shows how the chains "E" are affixed thereto.

"G" is the oblong link or ring which is affixed to the brake beam "A" as stated herein.

"H" is the axle to the truck or wagon, with the slot therein, through which the upper chain "E" passes in connecting from brake beam "A" with handle "F".

Having described my invention, what I claim as new and desire to secure by Letters Patent, is:

1. In a truck having a pivotally mounted axle, the combination of a brake beam with brake shoes, said brake beam being slidingly supported in brackets attached to said axle and connected to a pivotally mounted tongue by chains, one running forward below said axle and secured to the under part of said tongue, the other running forward through a slot or aperture in the axle and secured to the upper part of said tongue, whereby the raising or lowering of the tongue beyond a substantially horizontal position will set the brakes; and a spring, whose ends are mounted in said brackets and whose center is bolted to the brake beam by a bolt to which said chains are secured, to release the brakes, substantially as described.

2. In a truck having a pivotally mounted axle to which is secured brackets adapted to slidingly support a brake arm with brake shoes and to support a releasing spring whose center is bolted to said brake arm by a bolt to which two chains are connected, one running forward through an aperture in said axle and secured to the upper side of a pivotally mounted tongue, the other running forward under said axle and secured to the under side of said tongue whereby the raising or lowering of the tongue beyond a substantially horizontal position sets the brakes which are held normally open by said spring substantially as described.

GEORGE W. NORTHROP.

Witnesses:
MARINUS W. TERRY,
EBENEZER EVANS.